July 19, 1932. P. LA BURTHE 1,868,421
MOLD FOR THE MANUFACTURE OF ARTICLES IN SILICA GLASS AND THE LIKE
Filed Feb. 28, 1930   2 Sheets-Sheet 1
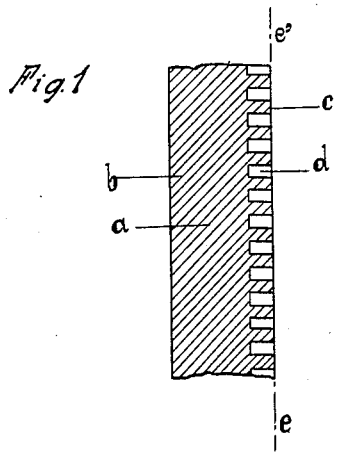
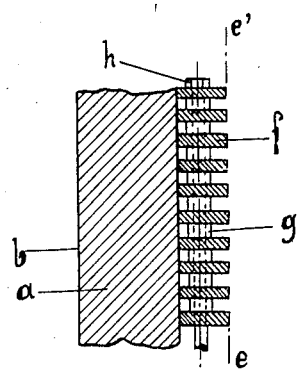
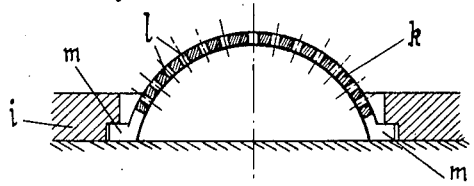
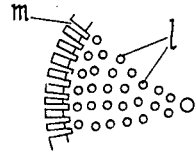
INVENTOR
PIERRE LA BURTHE
BY HIS ATTORNEYS
Howson and Howson

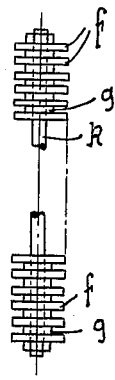
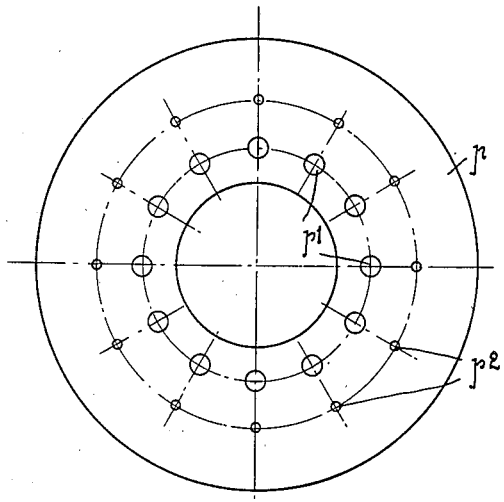
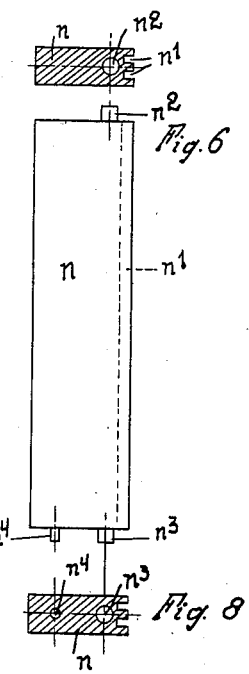
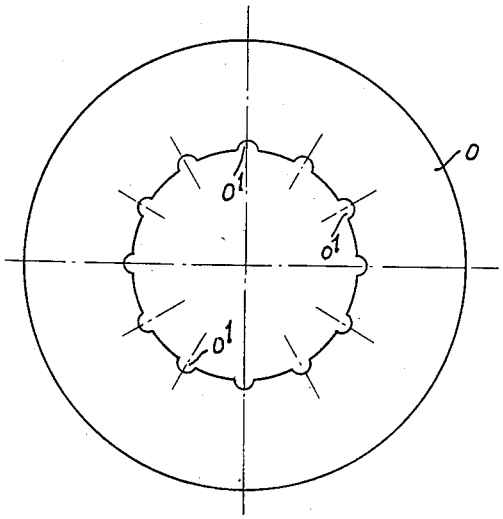

Patented July 19, 1932

1,868,421

UNITED STATES PATENT OFFICE

PIERRE LA BURTHE, OF NEMOURS, FRANCE, ASSIGNOR TO SOCIÉTÉ "QUARTZ & SILICE", OF PARIS, FRANCE, A CORPORATION OF FRANCE

MOLD FOR THE MANUFACTURE OF ARTICLES IN SILICA GLASS AND THE LIKE

Application filed February 28, 1930, Serial No. 432,180, and in France April 16, 1929.

It is known that articles made of opaque silica are obtained in the classical processes by the blowing of an ingot in a mold.

The ingots have the shape of a cylinder and are obtained by fusion of the raw material around a carbon electrode. Their internal surface is smooth and well vitrified; it will yield after blowing a pearly surface which is characteristic of silica glass. The external surface of the ingot, on the contrary, is covered with a layer of unfused incandescent sand which adheres to the subjacent plastic mass. This layer has a variable thickness which depends on the dimensions of the ingot.

It is the presence of this unfused layer, which becomes squeezed at the moment of the molding, between the material which expands and the wall of the mold, that gives to articles made of opaque silica their embossed and irregular appearance. It has indeed been proposed to provide the molds with orifices for the removal of the sand which falls from the ingot; this arrangement is useful but insufficient, for the greater part of the unfused sand does not fall but remains adherent to the subjacent plastic mass.

It has likewise been proposed to brush the ingots before their introduction into the mold, but that operation is dangerous, for the layer of adherent sand protects the exterior of the ingot against cooling during its transport from the furnace to the mold. To remove this layer is therefore to compromise the molding operation, and by cooling to a different extent various regions of the surface (the bottom for example more than the top), to risk an irregular expansion of the ingot in the mold.

The present invention has for its object a mode of construction of the molds allowing of obviating these disadvantages and of obtaining directly at the molding regular surfaces without bosses and of rigorous dimensions. It consists in providing, in the useful wall of the mold, uniformly distributed cavities sufficiently close together, and of which at least one of the superficial dimensions is of the order of some millimetres. The total opening of cavities represents for example the half of the useful surface of the mold and their depth is such that their total volume corresponds at least to the maximum volume of the layer of sand adherent to the ingot. The result of this arrangement is to accommodate the surplus sand in the wall itself of the mold.

Upon the accompanying drawings, which show by way of examples different forms of carrying out the invention, Figure 1 represents in section a broken part of the wall of the mold.

$a$ is the metal constituting the mold (cast iron, molded steel, special steel, etc.), $b$ the external face of the mold, $c$ the useful wall. In this wall are distributed uniformly the cavities $d$.

Experiment shows that by blowing an ingot in a mold thus constituted, there is obtained an article of which the external surface coincides exactly, as to form and dimensions, with the surface $e\ e'$ tangent to the wall of the mold. It is found at the same time that the sand, which was adherent to the ingot, fills the cavities $d$ regularly at all points.

The articles obtained are free from bosses and have a regular surface. Thus in particular it is possible to obtain directly from the foundry perfectly flat plates.

The cavities must be of fairly small opening in order to obviate that the silica should run and become molded therein; the minimum depth must be such that the total volume of the cavities corresponds to the maximum volume of sand adherent to the ingot. There is no disadvantage in increasing this depth. In the example of Figure 1, good results would be obtained with cavities of 2 to 3 m/m height and of 5 m/m depth.

The high viscosity of silica is here a favourable factor. Thus it is not necessary that the cavities shall be independent. It is quite possible, which greatly simplifies the construction, to form them by grooves or by a continuous screw-thread. It suffices that the width of the groove or of the screw thread shall not exceed approximately the half of the thickness of the article which it is desired to mold. Care must be taken, when employing grooves or a screw thread, to arrange them in a suitable direction in order to obviate the displacement of the sand by gravity in the interior of the groove. For example, if it is desired to mold plates in a vertical mold, the vertical panels will be grooved horizontally. Similarly, in order to mold pipes vertically in a cylindrical mold, the internal surface of the mold will preferably be provided with a screw thread having a small inclination to the horizontal. If on the contrary, it is desired to effect the molding horizontally, the grooves can be arranged parallel to the axis of the cylinder.

In all the preceding examples, the grooves or cavities are provided directly in the wall of the mold. In certain cases, it is possible, in order to facilitate the construction, to employ as useful surface of the mold members wholly perforated (skimmer) or having multiple elements forming a sort of grid. Two cases are then to be distinguished for the mounting of these members upon the mold panels:

(1) For molds of large dimensions, where a high pressure is utilized, the perforated member or the grid constituting the useful surface is laid on the interior of a panel capable of resisting the pressure.

In Figure 2, $a$ is the mold wall resistant to mechanical stresses, $b$ is its external face. Against the other face there is laid a grid, constituted by small flat iron bars $f$, arranged side by side and on edge, the spacing of these flat bars being ensured by separating washers $g$ threaded upon bolts or upon screw-threaded rods $k$, keeping the whole together.

(2) If on the contrary, it is a question of molding small articles and there is no reason to fear the mechanical fragility of the perforated member, it is submitted directly to the pressure; for example by mounting in the orifice of a panel. This arrangement allows of easily utilizing various shells upon the same panel.

Figure 3 is a view in axial vertical section, and Figure 4 a partial view in plan from below in this arrangement, $i$ is a mold panel, in which there is fitted a shell $k$, of which the internal face corresponds to that which it is desired to give to the finished article; this shell $k$ is provided with cavities such as $l$, which are blind holes or not, or grooves such as $m$, or both at the same time. The facilities of machining are, with care of the resistance of the shell to pressure effects, the sole conditions to be fulfilled, beyond the total minimum volume to be ensured for the sand to accommodate itself. On the drawings, the shell has been shown with the opening downwards, in order to make it quite clear that the evacuation of the sand by gravity is a matter of indifference, but that it is necessary and that it suffices on the contrary to accommodate it in suitable cavities.

In Fig. 2 the useful wall of the mold is constituted by a grid made of flat bars $f$ upon edge, laid against a solid wall $a$ intended to resist the pressure strains. The presence of this solid wall is not necessary if the flat bars have by themselves the moment of inertia sufficient to resist the forces which are assigned to them. It is possible then, as shown by Fig. 5, to constitute the useful wall of the mold by simple flat bars $f$ leaving between them definite intervals playing the part explained above. In order to obviate the lateral displacement of these thin flat bars $f$ by warping under heat, they can be connected together in bundles by means of a screw-threaded rod $k$, upon which they are spaced by separating washers $g$; each bundle forms a veritable small grid. Also flat bars can be taken of a greater thickness, 15 to 20 m/m for example, which are not liable to bend laterally, and that one of their faces in contact with which the article is to be molded, grooved in the manner hereabove described. This arrangement is shown by Figs. 6, 7 and 8, which are respectively a side elevation, a top and a bottom plan view of one of such flat bars, which is provided, in its molding face, with grooves $n^1$. The bars thus formed can then be set side by side or there can be left between them an interval analogous to a groove $n^1$ and which will play the same part. The whole group of the grooved faces of these bars $n$ will then constitute the useful face of the mold.

There results from this arrangement a very valuable consequence. When it is a question of constituting simple molds, such for example as those necessary for the molding of tubular or prismatic articles, it becomes possible to constitute such molds by bars in suitable number of which the active faces, provided with the grooves, envelop accurately the contour of the right section of the article which it is desired to obtain.

The cross section of the bars $n$ selected is such that they can resist the pressures which they have to undergo while being held fast only at their extremities.

Each of the bars $n$ is provided (Figs. 6, 7 and 9) with one stud $n^2$ at its upper end and with two studs, $n^3$ and $n^4$, at its lower end. These studs $n^2$, $n^3$ and $n^4$ allow of holding the bars $n$ fast at their extremities, by engagement of these studs in suitable recesses or openings provided in upper and lower members located at the top and at the bottom of the mold.

Figs. 9 and 10 are plan views of annular end members for a mold of cylindrical shape; the upper end member $o$ comprises, at its inner periphery, suitably spaced recesses $o^1$ intended to receive the upper studs $n^2$ of the bars $n$; the lower annular member $p$ is provided with two circular concentric rows of openings, $p^1$ and $p^2$, adapted to receive the lower studs $n^3$ and $n^4$, respectively, of the bars $n$.

In these conditions, in order to pass from one shape of mold to another, it is merely sufficient to change the upper and lower end members of the mold.

The full value of this arrangement will be understood, which procures in addition to the advantages previously mentioned that of allowing of constituting, in the minimum of time and at a very small cost, all new molds and of suppressing radically all the difficulties of turning the articles out of molds.

The above described arrangement must not be confused with the well known arrangement of vents, which have for their object the evacuation of the air at the moment of molding.

What has been said as regards the molding of silica glass, applies fully to the molding of any other hardly fusible material, manufactured from ingots of which the external surface retains a layer of unfused raw material.

In the claims the term "pure fused silica" is intended to include any other vitreous material having the same properties as pure fused silica in respect to molding, as explained in the early part of this specification.

What I claim is:

1. A mold for directly obtaining smooth faced articles of pure fused silica, said mold comprising a molding wall provided with substantially uniformly distributed cavities, of which at least one of the superficial dimensions is of the order of some millimeters.

2. A mold for the direct manufacture of pure fused silica provided with regular and smooth surfaces, said mold comprising a separate molding wall provided with substantially uniformly distributed cavities, of which at least one of the superficial dimensions is of the order of some millimeters.

3. A mold for the direct manufacture of pure fused silica provided with regular and smooth surfaces, said mold comprising a grate shaped separate molding wall provided with substantially uniformly distributed cavities, of which at least one of the superficial dimensions is of the order of some millimeters.

4. A mold for the manufacture of pure fused silica provided with regular and smooth surfaces, said mold comprising a detachable grate shaped separate molding wall provided with substantially uniformly distributed cavities, of which at least one of the superficial dimensions is of the order of some millimeters.

5. A mold for the manufacture of silica glass or vitreous material, comprising a detachable grate shaped separate molding wall provided with substantially uniformly distributed cavities, said molding wall consisting of edge laid flat bars fixed at their extremities and the useful face of which is grooved, for the purpose described.

6. A mold for the manufacture of silica glass or vitreous material, comprising a detachable grate shaped separate molding wall provided with substantially uniformly distributed cavities, said molding wall consisting of edge laid flat bars, connected in bundles and fixed at their ends, for the purpose described.

7. A mold for the manufacture of silica glass or vitreous material, comprising a detachable grate shaped separate molding wall provided with substantially uniformly distributed cavities, said molding wall consisting of edge laid flat bars fixed at their extremities and the useful face of which is grooved and arranged around a given curve, so as to envelop accurately the contour of the right section of the article which it is desired to obtain.

8. A mold for the manufacture of silica glass or vitreous material, comprising a detachable grate shaped separate molding wall provided with substantially uniformly distributed cavities, said molding wall consisting of edge laid flat bars, connected in bundles and fixed at their ends and arranged around a given curve so as to envelop accurately the contour of the right section of the article which it is desired to obtain.

9. A mold for directly obtaining smooth faced articles of pure fused silica, the molding wall of which is indented section, the width of the indentations being of the order of some millimeters.

10. A mold for directly obtaining smooth faced articles of pure fused silica, the molding wall of which is of crenel-shaped indented section, the width of the indentations being of the order of some millimeters.

11. A mold for directly obtaining articles of pure fused silica having a smooth and even surface, the molding wall of which is provided with a substantially parallel faced groove winding along the inner surface of said mold in a screw like manner, the width of said groove being of the order of some millimeters.

12. A mold for directly obtaining articles of pure fused silica having a smooth and even surface, the molding wall of which is provided with a plurality of substantially parallel-faced grooves at right angles to the axis of said mold, the width of said grooves being of the order of some millimeters.

13. A mold for directly obtaining articles of pure fused silica having a smooth and even surface, the molding wall of which is of indented section, the width of the indentations being of the order of some millimeters, and the distance between two adjacent indentations being substantially equal to the width of each of said indentations.

14. A mold for directly obtaining articles of pure fused silica having a smooth and even surface, the molding wall of which is of indented section, the width of the indentations being of the order of some millimeters, and their depth being substantially greater than said width.

15. A mold for directly obtaining articles of pure fused silica having a smooth and even surface, the molding wall of which is of crenel-shaped indented section, the width of the indentations being from 2 to 3 millimeters, and their depth being about 5 millimeters.

In testimony whereof I have signed my name to this specification.

PIERRE LA BURTHE.